(12) United States Patent
Cho

(10) Patent No.: US 9,710,703 B1
(45) Date of Patent: Jul. 18, 2017

(54) METHOD AND APPARATUS FOR DETECTING TEXTS INCLUDED IN A SPECIFIC IMAGE

(71) Applicant: StradVision Korea, Inc., Gyeongbuk (KR)

(72) Inventor: Hojin Cho, Gyeongsangbuk-do (KR)

(73) Assignee: StradVision, Inc., Pohang-si, Gyeongsangbuk-do (KR)

( * ) Notice: Subject to any disclaimer, the term of this patent is extended or adjusted under 35 U.S.C. 154(b) by 0 days.

(21) Appl. No.: 15/211,127

(22) Filed: Jul. 15, 2016

(51) Int. Cl.
*G06K 9/34* (2006.01)
*G06K 9/00* (2006.01)
*G06F 17/21* (2006.01)
*G06K 9/46* (2006.01)

(52) U.S. Cl.
CPC ......... *G06K 9/00442* (2013.01); *G06F 17/21* (2013.01); *G06K 9/4671* (2013.01)

(58) Field of Classification Search
CPC .. G06K 2209/01; G06K 9/46; G06K 9/00456; G06K 9/325; G06K 9/723; G06T 11/60
See application file for complete search history.

(56) References Cited

U.S. PATENT DOCUMENTS

| | | | |
|---|---|---|---|
| 8,478,052 B1 * | 7/2013 | Yee | G06K 9/4676 382/155 |
| 8,867,828 B2 * | 10/2014 | Kim | G06K 9/325 382/159 |
| 2010/0135578 A1 * | 6/2010 | Nakamura | G06K 9/38 382/190 |

OTHER PUBLICATIONS

Epshtein, Boris, Eyal Ofek, and Yonatan Wexler. "Detecting text in natural scenes with stroke width transform." Computer Vision and Pattern Recognition (CVPR), 2010 IEEE Conference on IEEE, 2010.,(published before this application Jul. 2016).
Chen, Xiangrong, and Alan L. Yuille. "Detecting and reading text in natural scenes." Computer Vision and Pattern Recognition, 2004. CVPR 2004. Proceedings of the 2004 IEEE Computer Society Conference on. vol. 2. IEEE, 2004, (published before this application Jul. 2016).

* cited by examiner

*Primary Examiner* — Eueng-Nan Yeh

(74) *Attorney, Agent, or Firm* — Husch Blackwell LLP

(57) ABSTRACT

A method for detecting texts included in a specific image is disclosed. The method includes steps of: (a) an apparatus detecting or allowing another device to detect one or more text candidates in the specific image by referring to feature values of pixels in the specific image; (b) the apparatus classifying or allowing another device to classify one or more weak texts in the specific image as strong texts by referring to information on at least one text classified as the strong text in another image related to the specific image if more than a certain percentage of the detected text candidates are classified as the weak texts as a result of comparison between at least one threshold value and at least one feature value of at least one pixel selected in a region where the detected text candidates are included or a value converted from the feature value.

26 Claims, 9 Drawing Sheets
(4 of 9 Drawing Sheet(s) Filed in Color)

FIG. 4

3X3 IMAGE PATCH
CENTERED AT 192

| 167 | 32  | 123 |
| --- | --- | --- |
| 23  | 192 | 10  |
| 32  | 226 | 197 |

MEAN = 101.25

>MEAN?

CLOCKWISE
MLBP ENCODING

| 1 | 0 | 1 |
| --- | --- | --- |
| 0 | - | 0 |
| 0 | 1 | 1 |

MLBP = 00110101$_{(2)}$ = 53$_{(10)}$

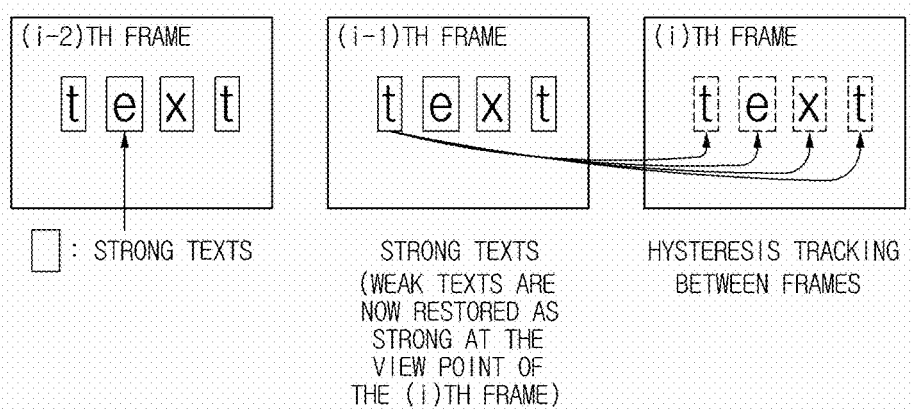

INPUT IMAGE

ERs AFTER NON-MAXIMUM SUPPRESSION

TEXTS CLASSIFIED WITH HIGH THRESHOLD

TEXTS CLASSIFIED WITH LOW THRESHOLD

HYSTERESIS BASED TRACKED TEXTS

RESULTS

METHOD AND APPARATUS FOR DETECTING TEXTS INCLUDED IN A SPECIFIC IMAGE

FIELD OF THE INVENTION

The present invention relates to a method and an apparatus for detecting texts included in a specific image; and more particularly, to the method and the apparatus for detecting or allowing another device to detect at least one text candidate in the specific image by referring to feature values of pixels in the specific image, and classifying or allowing another device to classify one or more weak texts in the specific image as one or more strong texts by referring to information on at least one text classified as a strong text in another image related to the specific image if more than a certain percentage of the detected text candidates are classified as the weak texts as a result of comparison between the detected text candidates and at least one threshold value.

BACKGROUND OF THE INVENTION

In many cases, as texts in an image provide significant information, detecting and recognizing scene texts have been considered important in a variety of applications for computer vision such as image and video retrieval, multi-language translator, and automotive assistance.

A scene text detection algorithm as an algorithm for detecting a text, i.e., a character, in an image may be largely divided into a sliding window method and a connected component analysis method depending on a scheme for extracting text candidates.

The sliding window method is a technique for detecting texts in a scene image by shifting a window in multiple scales at all locations of the image. Thanks to thorough searches for an inputted image, this technique has the advantage of high recall rates, i.e., rates showing how many text regions are detected. Contrarily, it cannot avoid too many calculations caused by scanning the window thoroughly and may cause a lot of false positive results due to a great number of text candidates. Accordingly, it is inappropriate for real-time applications. The sliding window method has been introduced in an article entitled "Detecting and reading text in natural scenes" in Proc. CVPR 2004 on pages 366-373 in 2004 by X. Chen and A. L. Yuille, etc.

As such, as the sliding window method requires a lot of calculations, the connected component analysis method is recently used more frequently. It is a method for extracting text candidates as a set of pixels which share similar text characteristics from an inputted image and refining the text candidates to suppress non-text candidates. The stroke width transform (SWT) and the maximally stable extremal regions (MSER) are representative techniques of the connected component analysis method. These methods provide state-of-the-art performance with regard to the detection of the scene texts. The connected component analysis method has been introduced in an article entitled "Detecting text in natural scenes with stroke width transform" in Proc. CVPR 2010 on pages 2963-2970 in 2010 by B. Epshtein, E. Ofek, and Y. Wexler, etc.

However, general constraints used to refine text candidates under the connected component analysis method have drawbacks of being limitedly evaluated upon detecting several true texts and consequentially showing low recall rates.

Accordingly, the inventor of the present invention suggested the technology of detecting a text with high recall rates while showing optimal performance in one image through U.S. patent application Ser. No. 15/014,441.

However, if more than a certain percentage of the detected text candidates in one image are classified as weak texts, it is difficult to determine whether the classified weak texts have similar characteristics to strong texts and therefore text tracking in use of hysteresis would be difficult in the frame.

Therefore, the inventor of the present invention came to invent the technology that can classify one or more weak texts in a specific image as one or more strong texts by referring to information on at least one text classified as the strong text from another image related to the specific image.

SUMMARY OF THE INVENTION

It is an object of the present invention to solve all the aforementioned problems.

It is another object of the present invention to provide a text detection technique with high recall rates even while making optimal performance.

It is still another object of the present invention to provide a technology of classifying one or more weak texts in a specific image as one or more strong texts by referring to information on at least one text classified as strong text in another image related to the specific image if more than a certain percentage of detected text candidates in the specific image are classified as the weak texts.

In accordance with one aspect of the present invention, there is provided a method for detecting texts included in a specific image, including steps of: (a) an apparatus detecting or allowing another device to detect one or more text candidates in the specific image by referring to feature values of pixels in the specific image; (b) the apparatus classifying or allowing another device to classify one or more weak texts in the specific image as strong texts by referring to information on at least one text classified as the strong text in another image related to the specific image if more than a certain percentage of the detected text candidates are classified as the weak texts as a result of comparison between at least one threshold value and at least one feature value of at least one pixel selected in a region where the detected text candidates are included or a value converted from the feature value.

In accordance with another aspect of the present invention, there is provided an apparatus for detecting texts included in a specific image, including: a communication part for acquiring the specific image; and a processor for (i) detecting or allowing another device to detect one or more text candidates in the specific image by referring to feature values of pixels in the specific image and (ii) classifying or allowing another device to classify the weak texts in the specific image as strong texts by referring to information on at least one text classified as the strong text in another image related to the specific image if more than a certain percentage of the detected text candidates are classified as the weak texts as a result of comparison between at least one threshold value and at least one feature value of at least one pixel selected in a region where the detected text candidates are included or a value converted from the feature value.

BRIEF DESCRIPTION OF THE DRAWINGS

The patent or application file contains at least one drawing executed in color. Copies of this patent or patent application publication with color drawings will be provided by the Office upon request and payment of the necessary fee.

The above and other objects and features of the present invention will become apparent from the following description of preferred embodiments given in conjunction with the accompanying drawings, in which:

FIG. 4 is a diagram illustrating an example of MLBP encoding.

FIG. 6 is a drawing to explain a method for hysteresis tracking among different image frames in accordance with one example embodiment of the present invention.

DETAILED DESCRIPTION OF THE PREFERRED EMBODIMENTS

Figure 1:
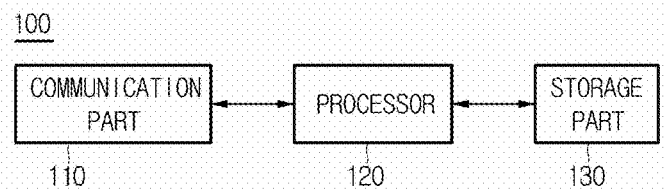
FIG. 1 is a block diagram illustrating a configuration of an apparatus for detecting one or more texts included in an image in accordance with one example embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The present invention suggests a text detection technique considering criteria as shown below. In this specification, a "detector" may be regarded as Canny Text Detector but it is not limited thereto. Explanation on the configuration of the present invention to satisfy each of the criteria as shown below will be made in details.

1. Recall: Text detection should localize as many text regions as possible.

2. Precision: The detection results should not contain non-text regions, if possible.

3. Uniqueness: Each detected character should be marked only once.

4. Compactness: The detected region (bounding box) should accurately localize its corresponding character to minimize extra margin.

Figure 2:
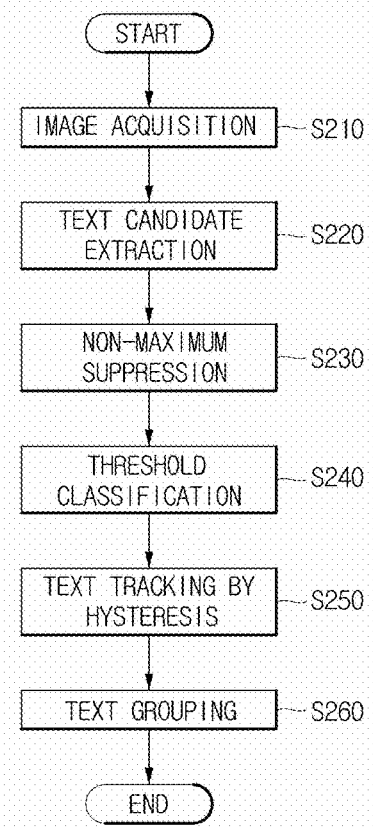
FIG. 2 is a flowchart showing a process of an apparatus detecting one or more texts included in an image in accordance with one example embodiment of the present invention.

FIG. 1 is a block diagram illustrating a configuration of an apparatus for detecting one or more texts included in an image in accordance with one example embodiment of the present invention and FIG. 2 is a flowchart showing a course of the apparatus detecting one or more texts included in an image in accordance with one example embodiment of the present invention.

By referring to FIG. 1, the apparatus 100 for detecting one or more texts included in an image in accordance with one example embodiment of the present invention includes a communication part 110, a processor 120, and a storage part 130.

The communication part 110 has a configuration for transmitting and receiving data to/from external devices or among internal components. In particular, the communication part 110 may acquire an inputted image for detecting one or more texts at a step of S210.

The processor 120 has a configuration of performing various operations with regard to a variety of data. First of all, the processor 120 may detect or allow another device to detect one or more text candidates in the inputted image, if being acquired, by referring to feature values of pixels included in the inputted image at a step of S220.

According to an embodiment of the present invention, at the time, if the feature values of all pixels included in a specific region in the inputted image are larger than those in the outer boundary pixels of the specific region, the processor 120 may detect or allow another device to detect the specific region as one text candidate. Mathematically, it is defined as follows:

$$R_t = \{x | I(x) > I(y) \forall x \in R_t, \forall y \in B(R_t)\} \qquad \text{<Mathematical Equation 1>}$$

where x and y are pixel indices of a given single channel I, t is a threshold value used for extracting the text candidate region, and $B(R_t)$ is the set of boundary pixels of $R_t$. According to another embodiment of the present invention, which is the reverse case of the above-mentioned embodiment, if the feature values of all pixels included in a specific region in the inputted image are smaller than those in the outer boundary pixels of the specific region, the processor 120 may detect or allow another device to detect the specific region as one text candidate.

Next, it would be also possible to build an ER tree by using extremal regions (ERs). In short, the processor 120 may detect or allow another device to detect the one or more text candidates while changing the intensity levels of the pixels of the specific region and may also do, or allow another device to do, build a tree by allocating (i) a low-level text candidate whose intensity level of the pixel of the specific region is relatively high and (ii) a text candidate whose intensity level of the pixel of the specific region is the highest among high-level text candidates whose intensity level of the pixel of the specific region is relatively low, to a child node and a parent node, respectively. Herein, respective regions of the high-level text candidates include a region of the low-level text candidate.

Figure 3:
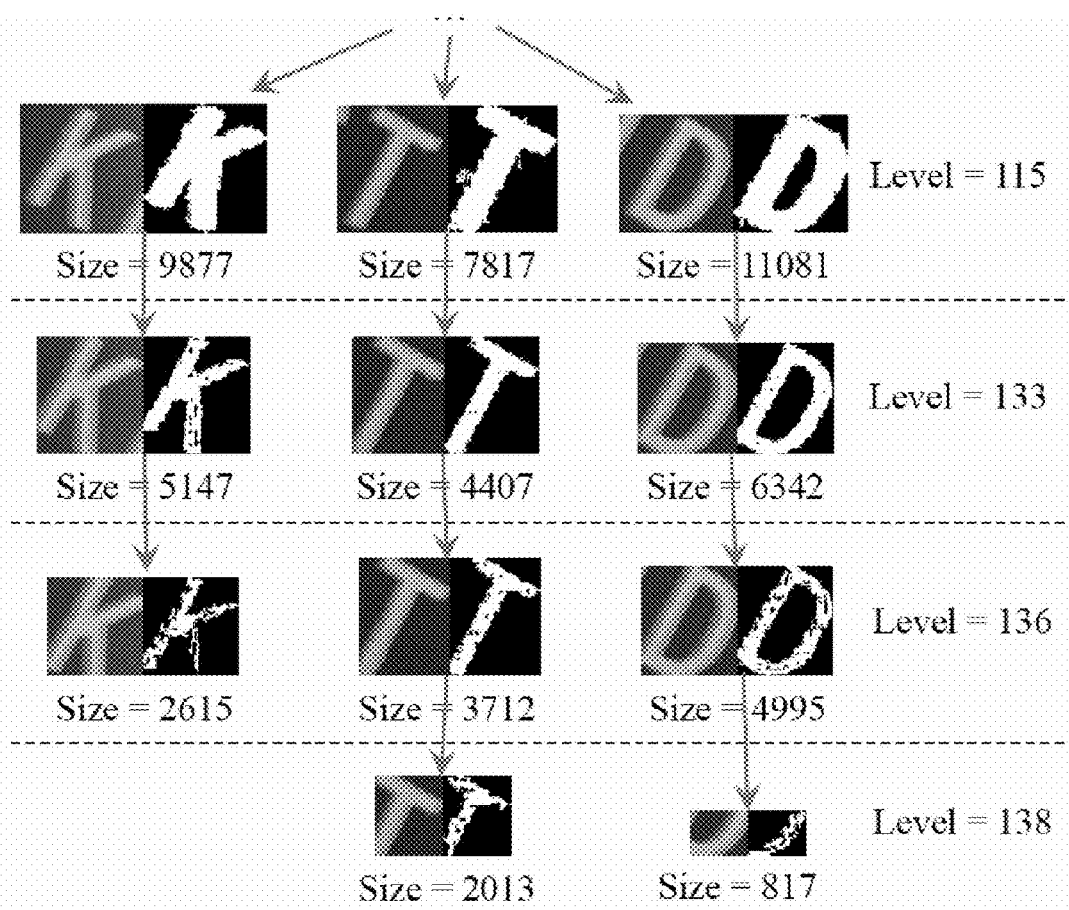
FIG. 3 is a diagram illustrating an example of an ER tree in accordance with one example embodiment of the present invention.

FIG. 3 is a diagram illustrating an example of an ER tree in accordance with one example embodiment of the present invention.

In the example illustrated in FIG. 3, it can be found that a text candidate with the intensity level of 136 and a text candidate with the intensity level of 133 including a region of the text candidate with the intensity level of 136 are allocated, respectively, to a child node and a parent node of the ER tree.

Next, the processor 120 may perform or allow another device to perform threshold classification at a step of S240. In other words, the processor 120 may classify a text by referring to a result of comparison between a detected text candidate and at least one threshold value. The result of comparison may be acquired by referring to a feature value of at least one pixel selected in a region where the detected text candidate is included or a value converted from the feature value. As the case may be, it may be introduced that the threshold value has a first and a second threshold value. In this case, the processor 120 may classify or allow another device to classify the detected text candidate as a strong text or a non-strong text by referring to a comparison result between a first threshold value and a first feature value of at least one pixel selected within a corresponding region where the detected text candidate is included or a value converted from the first feature value and then classify or allow another device to classify the text candidate classified as the non-strong text as a weak text or a non-weak text by referring to a comparison result between a second threshold value and a second feature value of at least one pixel selected within a corresponding region where the text candidate classified as the non-strong text is included or a value converted from the second feature value. For example, the processor 120 may classify or allow another device to classify the detected text candidate by using an AdaBoost-type classifier.

Herein, the region where the detected text candidate is included may be a bounding box area including the detected text candidate with the extra margin minimized.

In addition, a strong text means a detected text candidate which has a relatively high possibility of being determined as a real text. Contrarily, a weak text means a detected text candidate which has a relatively low possibility of being determined as a real text in comparison with the strong text and a non-text means a detected text candidate which has an extremely low possibility of being determined as a real text.

Besides, the first threshold value may be a high one and the second threshold value may be a low one. The different threshold values may give degrees of precision differently. For example, the first and the second threshold values may give a degree of precision of 99% and that of 90%, respectively. As such, the second threshold value may show lower degree of precision compared to the first threshold value but may show relatively higher recall rates.

Besides, the processor 120 may perform or allow another device to perform the classification by referring to a value converted from the feature value of the pixel selected in the region where the detected text candidate is included by using a mean local binary pattern (MLBP).

FIG. 4 is a diagram illustrating an example of MLBP encoding.

By referring to FIG. 4, the average value of 8-connected neighbor pixels (neighbor patches in a 3×3 patch) around the selected pixel in the region where the detected text candidate is included is first calculated. If a value of a preset neighbor pixel is larger than the average value of the 8-connected neighbor pixels, 1 is allocated to the preset pixel, otherwise 0. Then, the values allocated as mentioned above may be read clockwise from the left-top neighbor pixel. Accordingly, the values are regarded as an encoded number, i.e., binary numbers consisting of 8 bits. In an example illustrated in FIG. 4, it can be found that the MLBP value is $00110101_{(2)}$ as binary numbers. However, the features available in the present invention are not limited to the MLBP but a variety of other features could be used.

Meanwhile, text candidates could be classified by being compared with one threshold value or two threshold values over one or two steps. Herein, the latter case is referred to as double threshold classification. Of course, classification could be also made over more than two steps. In other words, there may be at least one middle threshold value between the first and the second threshold values, in which case, the processor 120 may classify or allow another device to classify (ii-1) a text candidate classified as a non-strong text as the strong text or a subordinated weak text by comparing with the middle threshold value and (ii-2) the subordinated weak text candidate as the weak text or the non-text by comparing with the second threshold value.

The processor 120 may perform or allow another device to perform non-maximum suppression at a step of S230 before performing the threshold classification.

In short, if multiple text candidates are detected, the processor 120 may identify at least one text candidate set including a text candidate which overlaps by no less than a certain percentage among respective regions where the detected multiple text candidates are included and select or allow another device to select a text candidate satisfying a predetermined condition among the identified text candidate set. In this case, the processor 120 may classify or allow another device to classify the text candidate satisfying the predetermined condition by referring to the comparison result between a feature value of at least one pixel selected in a region where the text candidate is included (or a value converted from the feature value) and at least one threshold value.

As shown above, the overlaps among the regions where text candidates are included sometimes appear in maximally stable extremal regions (MSERs) and ERs. To guarantee the Uniqueness criterion as for an ER tree, it would be possible to suppress repeated ERs (or nodes) and select only one ER with the maximum stability.

The course of non-maximum suppression is explained in more details as follows:

Upon building an ER tree, (a) for a particular node in the ER tree as stated above, if there occurs no less than a certain percentage of an overlap between a first region where a text candidate corresponding to the particular node is included and a second region, including the first region, where a text node, with a relatively low intensity level of the pixel of the specific region, corresponding to a parent node is included for no less than a specified number of times, (b) the processor 120 may select or allow another device to select a text candidate corresponding to a node whose variant of a region where a text candidate is included is relatively smallest compared to its preset parent node.

To determine (a), the following formula may be used:

$$O(R_{t-k}, R_t) = \frac{|R_t|}{|R_{t-k}|} \qquad \text{<Mathematical Equation 2>}$$

where $R_{t-k}$ is the parent of $R_t$ in the ER tree, and $|R|$ denotes the bounding box area of R (a region where the text candidate is included).

For example, (b) may be performed if $O(R_{t-k}, R_t) > 0.7$ for no less than five times. (b) may mean that the ER with the highest stability is selected and the stability may be expressed as shown in the mathematical equation below.

$$S(R_t) = \frac{(|R_{t-k}| - |R_t|)}{|R_t|} \qquad \text{< Mathematical Equation 3 >}$$

where it could be set as k=2. In this case, the stability could be considered for the particular node and its grandparent node.

For reference, if there exist two or more ERs with the same stability, an ER with the smallest region (bounding box area) could be selected. Through these, both Uniqueness and Compactness criteria could be satisfied.

Besides, if the number of overlaps at $R_t$ is larger than three and $R_t$ has not been removed by the non-maximum constraints, $R_t$ may be considered as a text candidate. However, if a text candidate has too large or too small aspect ratio, such candidate may be removed.

In the aforementioned case, the processor 120 may classify or allow another device to classify the selected text candidate in comparison between the selected text candidate and at least one threshold value by referring to a feature value of at least one pixel selected in the region where the selected text candidate is included or a value converted from the feature value.

Again, by referring to FIG. 2, the processor 120 may perform or allow another device to perform text tracking by hysteresis at a step of S250. In other words, the processor 120 may determine whether to classify or allow another device to classify the weak text as the strong text by referring to information on the strong text and information on the weak text classified as shown above. More specifically, the processor 120 may classify or allow another device to classify the weak text as the strong text or a non-text by referring to the information related thereto.

As shown above, a text candidate classified as a strong text may have a high possibility of being determined as a real text. However, even a text candidate classified as a weak text may have a possibility of being determined as a real text. Accordingly, the present invention regards a weak text as a strong text if the weak text has a characteristic similar to the strong text. In short, a text candidate classified as the weak text may be found from the neighbor of the strong text and the weak text may be dealt with a newly-added strong text if it has a characteristic similar to the strong text. This may allow a high recall rate to be achieved.

Information considered to determine whether the strong text and the weak text have any similar characteristics may include at least part of the information on locations, sizes, colors, and stroke widths of the strong text and the weak text.

Figure 5:
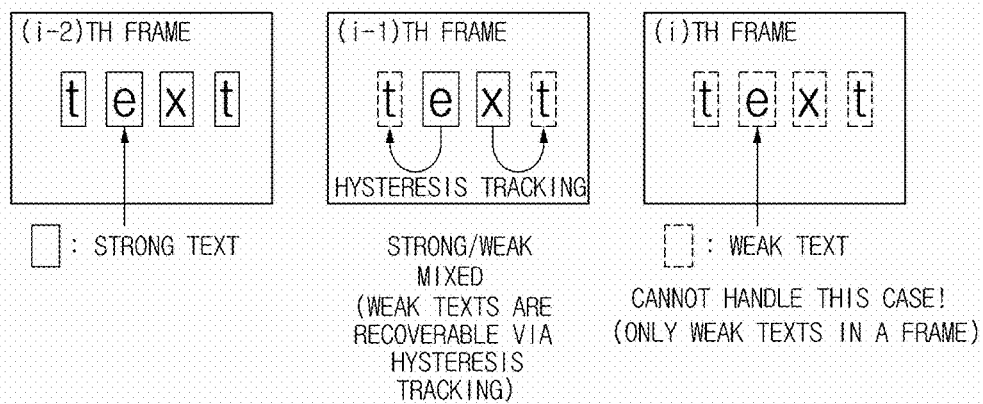
FIG. 5 is a drawing to explain the difficulty of text tracking considering hysteresis in a specified frame if only weak texts are detected in the specific frame.

However, if a considerable number of detected text candidates in one image, e.g., more than a certain percentage of the detected text candidates in one image, are classified as weak texts, it may be difficult to classify the weak texts as strong texts or non-texts because it is difficult to determine whether the weak texts have similar characteristics to the strong texts by using the aforementioned method. FIG. 5 shows this case.

FIG. 5 shows the difficulty of text tracking considering hysteresis in a specified frame if only the weak texts are detected in the specified frame.

By referring to an example in FIG. 5, on condition that there are an (i−2)th image frame, (i−1)th image frame, and (i)th image frame that form a video (where i is an integer greater than 2), if more than a certain percentage of the detected text candidates in the (i)th image frame are classified as weak texts, the text tracking considering the hysteresis may difficult unlike the (i−1)th image frame.

In this case, the processor 120 in the present invention may classify or allow another device to classify the weak texts of the inputted image, i.e., the (i)th image frame, as strong texts by referring to information on at least one text classified as the strong text in another image, e.g., the (i−2)th image frame or the (i−1)th image frame, related to the inputted image, i.e., the (i)th image frame.

FIG. 6 is a drawing to explain a method for tracking hysteresis among image frames in accordance with one example embodiment of the present invention.

As an example in FIG. 6, even though the detected text candidates in the (i)th image frame have been classified as weak texts, the processor 120 may classify or support another device to classify the weak texts of the (i)th image frame as the strong texts by referring to the information on the texts classified as the strong texts in the (i−1)th image frame.

Herein, if the inputted image is the (i)th image frame of the video, the "another image" related to the inputted image is assumed to be the (i−1)th image frame. However, as a generalized case, the "another image" related to the inputted image may be the (i−k)th image frame (provided that k is an integer equal to or greater than 1).

Instead, the another image related to the inputted image could be an (i+m)th image frame (provided that m is an integer equal to or greater than 1).

In addition, the another image related to the inputted image could be also at least one of image frames located before or after, or located before and after, the (i)th image frame.

Besides, the inputted image could be not only an image frame included in the video but also an independent specific image. In the latter case, the another image related to the specific image may be an image closely associated with the specific image.

Herein, a certain percentage can be determined to be 100%. In this case, if all the detected text candidates are classified as the weak texts, the weak texts may or may not be converted into strong texts by referring to information on the texts classified as the strong texts from another image related to the specific image.

In addition, if (i) multiple text candidates detected from the inputted image are adjacent to each other, and (ii) more than the certain percentage of the multiple text candidates adjacent to each other are classified as weak texts as a result of comparison between the adjacent multiple text candidates and at least one threshold value by referring to the pixel value of at least one pixel selected within a region where the multiple text candidates are included or a value converted from the pixel value, the processor 120 may determine or allow another device to determine whether the weak texts are classified as strong texts or not by referring to information on the texts classified as the strong texts from another image related to the specific image.

Next, the processor 120 may group or allow another device to group strong texts or those changed from the weak texts at a step of S260. In particular, if there are multiple strong texts transferred from the weak texts, the processor 120 may group or allow another device to group the multiple strong texts.

In addition, if a first strong text and a second strong text changed from a first weak text neighboring the first strong text are grouped and a second weak text is classified as a third strong text by referring to information on the second strong text and its neighboring second weak text, the processor 120 may group or allow another device to group the third strong text with the first and the second strong texts. As such, the present invention may perform the grouping by incorporating weak texts, whose characteristic is similar to a strong text among weak texts located near the strong text, into the strong text one by one.

Besides, the minimum-area encasing rectangle may be computed to provide compact bounding boxes as output. The smallest rectangle that encloses the grouped texts in the 2D image space may be calculated by using the 2D coordinates of character pixels.

FIGS. 7A to 7F are drawings showing intermediate results of text detections from example images by using a text detection technique in accordance with the present invention.

Figure 7A:
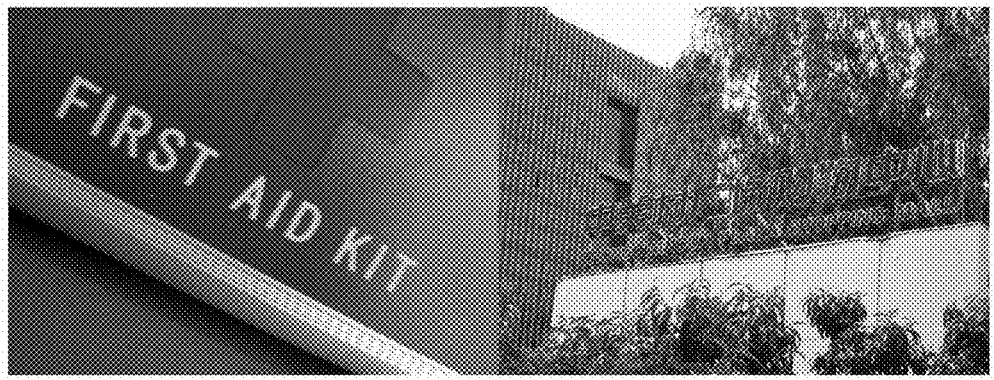
FIGS. 7A to 7F are drawings showing intermediate results of text detections by applying a text detection technique in accordance with the present invention to example images.
Figure 7B:
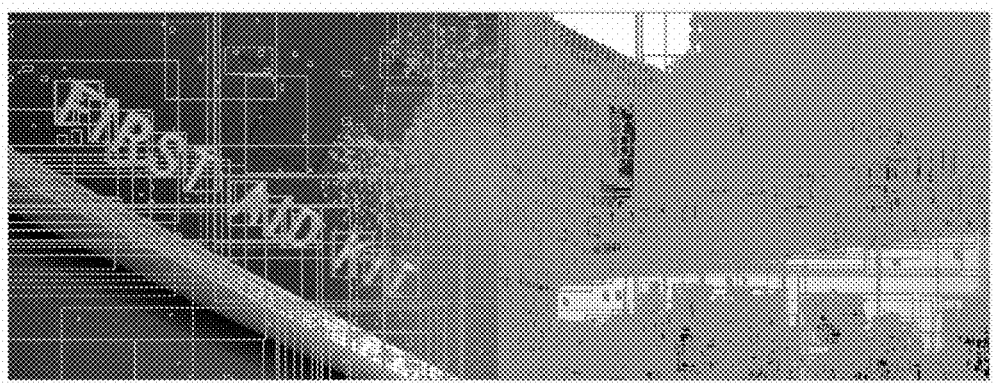
Figure 7C:
Figure 7D:
Figure 7E:
Figure 7F:

If an inputted image in FIG. 7A is acquired, FIG. 7B shows ERs selected after non-maximum suppression. FIG. 7C illustrates the result of the text candidates classified by using a high threshold, and it can be found that the relatively small number of text candidates is classified as strong texts. FIG. 7D shows the result of the text candidates classified as weak texts by using a low threshold, and it can be found that the relatively large number of text candidates is classified. FIG. 7E shows the result of the text tracking. As the result, many weak texts may be changed to strong texts. FIG. 7F shows a final result of the text grouping process.

The processor 120 performs a function of controlling the flow of data between the communication part 110 as explained above and the storage part 130 to be explained later. In short, the processor 120 controls the communication part 110, and the storage part 130 to perform their respective unique functions by controlling the flow of the data among components of the apparatus 100.

The processor 120 may include a hardware configuration that provides a micro processing unit (MPU), a central processing unit (CPU), cache memory, and data bus. Besides, it may further include a software configuration that provides an operating system and an application for performing a fixed purpose.

The storage part 130 has a configuration for storing a variety of data. In particular, the storage part 130 may store intermediate results as data produced at each step of detecting texts. Moreover, it may store software such as the operating system, or the application for performing the fixed purpose.

In accordance with the present invention, the following effects can be found:

The present invention has an effect of providing a text detection technique with high recall rates while making optimal performance.

In addition, the present invention has an effect of classifying weak texts as strong texts if more than a certain percentage of text candidates detected from a specific image are classified as the weak texts by referring to information on texts classified as the strong texts from another image related to the specific image.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variants equal or equivalent to the patent claims pertain to the category of the thought of the present invention.

What is claimed is:

1. A method for detecting texts included in a specific image, comprising steps of:
   (a) an apparatus detecting or allowing another device to detect one or more text candidates in the specific image by referring to feature values of pixels in the specific image;
   (b) the apparatus classifying or allowing another device to classify one or more weak texts in the specific image as strong texts by referring to information on at least one text classified as a strong text in another image related to the specific image if more than a certain percentage of the detected text candidates are classified as the weak texts as a result of comparison between at least one threshold value and at least one feature value of at least one pixel selected in a region where the detected text candidates are included or a value converted from the feature value.

2. The method of claim 1, wherein, at the step of (b), the apparatus determines or allows another device to determine whether the weak texts are converted into the strong texts or not by referring to the information on the text classified as the strong text in the another image related to the specific image if all the detected text candidates are classified as the weak texts.

3. The method of claim 1, wherein, at the step of (b), (i) if the multiple text candidates detected in the specific image are adjacent to each other, and (ii) if more than the certain percentage of the multiple text candidates adjacent to each other are classified as the weak texts as the result of comparison between the at least one threshold value and the at least one feature value of the at least one pixel selected in the region where the detected multiple text candidates are included or the value converted from the feature value, the apparatus classifies or allows another device to classify the weak texts among the multiple text candidates as the strong texts by referring to the information on the text classified as the strong text in the another image related to the specific image.

4. The method of claim 1, wherein the step of (b) includes steps of:
   (b1) the apparatus (i) classifying or allowing another device to classify each of the detected text candidates as a strong text or a non-strong text by comparing the at least one feature value or the value converted from the feature value with at least a first threshold value and (ii) classifying or allowing another device to classify each of the text candidates classified as the non-strong text as a weak text or a non-text by comparing the at least one feature value or the value converted from the feature value with at least a second threshold value, and (b2) the apparatus classifying or allowing another device to classify the weak texts in the specific image as the strong texts by referring to the information on the text classified as the strong text in the another image related to the specific image if more than the certain percentage of the detected text candidates are classified as the weak texts.

5. The method of claim 4, wherein, at the step of (b1), if there is at least one middle threshold value between the first and the second threshold values, the apparatus classifies or allows another device to classify (i) the text candidate classified as the non-strong text as the strong text or a subordinated weak text by comparing the at least one feature value or the value converted from the feature value with the middle threshold, and (ii) the subordinated weak text as the weak text or the non-text by comparing the at least one feature value or the value converted from the feature value with the second threshold value.

6. The method of claim 1, wherein, if the specific image is an (i)th image frame of a video, the another image related to the specific image is an (i−k)th image frame, provided that k is an integer equal to or greater than 1, wherein "i" is an integer index specifying the specific image among image frames of the video.

7. The method of claim 1, wherein, if the specific image is an (i)th image frame of a video, the another image related to the specific image is an (i+m)th image frame, provided that m is an integer equal to or greater than 1, wherein "i" is an integer index specifying the specific image among image frames of the video.

8. The method of claim 1, wherein, if the specific image is an (i)th image frame of a video, the another image related to the specific image includes multiple image frames located before, after, or before and after the (i)th image frame, wherein "i" is an integer index specifying the specific image among image frames of the video.

9. The method of claim 1, after the step of (a), further comprising a step of: (a1) the apparatus identifying or allowing another device to identify at least one text candidate set including text candidates whose corresponding regions overlap by at least a specific percentage, and selecting or allowing another device to select the text candidate satisfying a predetermined condition among the identified text candidate set, and wherein, at the step of (b), if the text candidate satisfying the predetermined condition is classified as the weak text with more than the certain percentage, the apparatus classifies or allows another device to classify the weak text in the specific image as the strong text by referring to the information on the text classified as the strong text in the another image related to the specific image.

10. The method of claim 1, wherein, at the step of (a), the apparatus detects or allows another device to detect one or more text candidates while changing intensity levels of the pixels of a specific region in the specific image, and builds or allows another device to build a tree by allocating (i) a low-level text candidate whose intensity level in the specific region is relatively high and (ii) a text candidate whose intensity level is the highest among high-level text candidates whose intensity level in the specific region is relatively low, to a child node and a parent node, respectively, and wherein respective regions of the high-level text candidates include a region of the low-level text candidate.

11. The method of claim 10, wherein, if there occurs no less than a specific percentage of an overlap between at least one first region where at least one text candidate corresponding to at least one child node in the tree is included and at least one second region where at least one text candidate, with a relatively low intensity level of the pixel, corresponding to at least one parent node of the child node is included for no less than a specified number of times, provided that the second region is larger than the first region and includes the first region, the apparatus selects or allows another device to select at least one text candidate corresponding to the child node if difference between an area of a region of the text candidate of the child node and that of its parent node are relatively small; and wherein, at the step of (b), the apparatus classifies or allows another device to classify the weak text of the specific image as the strong text by referring to the information on the text classified as the strong text in the another image related to the specific image if more than the certain percentage of the detected text candidates are classified as the weak texts.

12. The method of claim 1, further comprising a step of: (c) the apparatus grouping or allowing another device to group the strong texts if the number of the strong texts converted from the weak texts are more than two.

13. The method of claim 12, wherein, if a first strong text and a second strong text converted from a first weak text are grouped and a second weak text is converted into a third strong text by referring to information on the second strong text and the second weak text, the apparatus groups or allows another device to group the third strong text with the first strong text and the second strong text.

14. An apparatus for detecting texts included in a specific image, comprising:

a communication part for acquiring the specific image; and a processor for (i) detecting or allowing another device to detect one or more text candidates in the specific image by referring to feature values of pixels in the specific image and (ii) classifying or allowing another device to classify weak texts in the specific image as strong texts by referring to information on at least one text classified as a strong text in another image related to the specific image if more than a certain percentage of the detected text candidates are classified as the weak texts as a result of comparison between at least one threshold value and at least one feature value of at least one pixel selected in a region where the detected text candidates are included or a value converted from the feature value.

15. The apparatus of claim 14, wherein the processor determines or allows another device to determine whether the weak texts are converted into the strong texts or not by referring to the information on the text classified as the strong text in the another image related to the specific image if all the detected text candidates are classified as the weak texts.

16. The apparatus of claim 14, wherein, (i) if the multiple text candidates detected in the specific image are adjacent to each other, and (ii) if more than the certain percentage of the multiple text candidates adjacent to each other are classified as the weak texts as the result of comparison between the at least one threshold value and the at least one feature value of the at least one pixel selected in the region where the detected multiple text candidates are included or the value converted from the feature value, the processor classifies or allows another device to classify the weak texts among the multiple text candidates as the strong texts by referring to the information on the text classified as the strong text in the another image related to the specific image.

17. The apparatus of claim 14, wherein the processor (i) classifies or allows another device to classify each of the detected text candidates as a strong text or a non-strong text by comparing the at least one feature value or the value converted from the feature value with at least a first threshold value and (ii) classifying or allowing another device to classify each of the text candidates classified as the non-strong text as a weak text or a non-text by comparing the at least one feature value or the value converted from the feature value with at least a second threshold value and wherein the processor classifies or allows another device to classify the weak texts in the specific image as the strong texts by referring to the information on the text classified as the strong text in the another image related to the specific image if more than the certain percentage of the detected text candidates are classified as the weak texts.

18. The apparatus of claim 17, wherein, if there is at least one middle threshold value between the first and the second threshold values, the processor classifies or allows another device to classify (i) the text candidate classified as the non-strong text as the strong text or a subordinated weak text by comparing the at least one feature value or the value converted from the feature value with the middle threshold, and (ii) the subordinated weak text as the weak text or the non-text by comparing the at least one feature value or the value converted from the feature value with the second threshold value.

19. The apparatus of claim 14, wherein, if the specific image is an (i)th image frame of a video, the another image related to the specific image is an (i−k)th image frame, provided that k is an integer equal to or greater than 1, wherein "i" is an integer index specifying the specific image among image frames of the video.

20. The apparatus of claim 14, wherein, if the specific image is an (i)th image frame of a video, the another image related to the specific image is an (i+m)th image frame, provided that m is an integer equal to or greater than 1, wherein "i" is an integer index specifying the specific image among image frames of the video.

21. The apparatus of claim 14, wherein, if the specific image is an (i)th image frame of a video, the another image related to the specific image includes multiple image frames located before, after, or before and after the (i)th image frame, wherein "i" is an integer index specifying the specific image among image frames of the video.

22. The apparatus of claim 14, wherein, if there are multiple text candidates detected, the processor identifies or allows another device to identify at least one text candidate set including text candidates whose corresponding regions overlap by at least a specific percentage, and selects or allows another device to select the text candidate satisfying a predetermined condition among the identified text candidate set, and wherein, if the text candidate satisfying the predetermined condition is classified as the weak text with more than the certain percentage, the processor classifies or allows another device to classify the weak text in the specific image as the strong text by referring to the information on the text classified as the strong text in the another image related to the specific image.

23. The apparatus of claim 14, wherein the processor detects or allows another device to detect one or more text candidates while changing intensity levels of the pixels of a specific region in the specific image, and builds or allows another device to build a tree by allocating (i) a low-level text candidate whose intensity level in the specific region is relatively high and (ii) a text candidate whose intensity level is the highest among high-level text candidates whose intensity level in the specific region is relatively low, to a child node and a parent node, respectively, and wherein respective regions of the high-level text candidates include a region of the low-level text candidate.

24. The apparatus of claim 23, wherein, if there occurs no less than a specific percentage of an overlap between at least one first region where at least one text candidate corresponding to at least one child node in the tree is included and at least one second region where at least one text candidate, with a relatively low intensity level of the pixel, corresponding to at least one parent node of the child node is included for no less than a specified number of times, provided that the second region is larger than the first region and includes the first region, the processor selects or allows another device to select at least one text candidate corresponding to the child node if difference between an area of a region of the text candidate of the child node and that of its parent node are relatively small; and wherein the processor classifies or allows another device to classify the weak text of the specific image as the strong text by referring to the information on the text classified as the strong text in the another image related to the specific image if more than the certain percentage of the detected text candidates are classified as the weak texts.

25. The apparatus of claim 14, wherein the processor groups or allows another device to group the strong texts if the number of the strong texts converted from the weak texts are more than two.

26. The apparatus of claim 25, wherein, if a first strong text and a second strong text converted from a first weak text are grouped and a second weak text is converted into a third strong text by referring to information on the second strong text and the second weak text, the processor groups or allows another device to group the third strong text with the first strong text and the second strong text.

* * * * *